(12) United States Patent
Shumate

(10) Patent No.: US 7,141,764 B1
(45) Date of Patent: Nov. 28, 2006

(54) EXTERNALLY HEATED DEEP FAT FRYER

(76) Inventor: Eldridge J. Shumate, 1273 Parkway Gardens Ct., #107, Louisville, KY (US) 40217-1283

( * ) Notice: Subject to any disclaimer, the term of this patent is extended or adjusted under 35 U.S.C. 154(b) by 106 days.

(21) Appl. No.: 10/930,672

(22) Filed: Aug. 31, 2004

(51) Int. Cl.
 *A47J 37/12* (2006.01)
 *A47J 36/02* (2006.01)

(52) U.S. Cl. .................... 219/430; 219/439; 99/403

(58) Field of Classification Search .............. None
 See application file for complete search history.

(56) References Cited

U.S. PATENT DOCUMENTS

| | | | |
|---|---|---|---|
| 2,725,460 A | 11/1955 | Braski et al. | |
| 2,899,889 A * | 8/1959 | Wilson | 99/408 |
| 2,969,452 A * | 1/1961 | Geller et al. | 219/436 |
| 3,432,642 A * | 3/1969 | Lohr et al. | 219/439 |
| 3,677,170 A * | 7/1972 | Shelton et al. | 99/408 |
| 3,712,289 A | 1/1973 | Reid, Jr. et al. | |
| 3,722,498 A | 3/1973 | Kimbrough | |
| 4,198,559 A | 4/1980 | Walter et al. | |
| 4,273,991 A | 6/1981 | Barnhill | |
| 4,574,183 A | 3/1986 | Knauss | |
| 4,625,098 A | 11/1986 | Joe | |
| 4,629,866 A * | 12/1986 | Proctor | 219/439 |
| 4,660,542 A | 4/1987 | Scherer | |
| 4,690,127 A | 9/1987 | Sank | |
| 4,717,809 A | 1/1988 | Schwizer | |
| 4,798,939 A * | 1/1989 | Nett | 99/403 |
| 4,913,041 A | 4/1990 | Taber et al. | |
| 5,092,229 A | 3/1992 | Chen | |
| 5,355,776 A | 10/1994 | Driskill | |
| 5,429,039 A | 7/1995 | Chang | |
| 5,452,683 A * | 9/1995 | Poffenroth | 119/73 |
| 5,524,527 A | 6/1996 | Dumoux et al. | |
| 5,567,458 A | 10/1996 | Wu | |
| 5,794,522 A | 8/1998 | Bois et al. | |
| 5,809,995 A * | 9/1998 | Kobayashi et al. | 99/403 |
| 5,927,181 A | 7/1999 | Desnoyers et al. | |
| 5,961,866 A * | 10/1999 | Hansen | 219/403 |
| 6,002,111 A | 12/1999 | Beugnot et al. | |
| 6,006,658 A | 12/1999 | Siu | |
| 6,044,839 A * | 4/2000 | Furuhashi | 99/403 |
| 6,505,546 B1 * | 1/2003 | Koether et al. | 99/403 |
| 6,515,262 B1 * | 2/2003 | Li | 219/429 |

* cited by examiner

*Primary Examiner*—Joseph Pelham
(74) *Attorney, Agent, or Firm*—Stites & Harbison, PLLC; David W. Nagle, Jr.

(57) ABSTRACT

An externally heated deep fat fryer includes a tank defined by a plurality of side walls and at least one bottom wall for receiving and holding a volume of cooking oil. Heating elements are positioned adjacent to a substantial portion of the external surfaces of the walls of the tank for providing substantially uniform heating through the walls and to the cooking oil, while insulation material surrounding the heating elements minimizes heat losses.

8 Claims, 2 Drawing Sheets

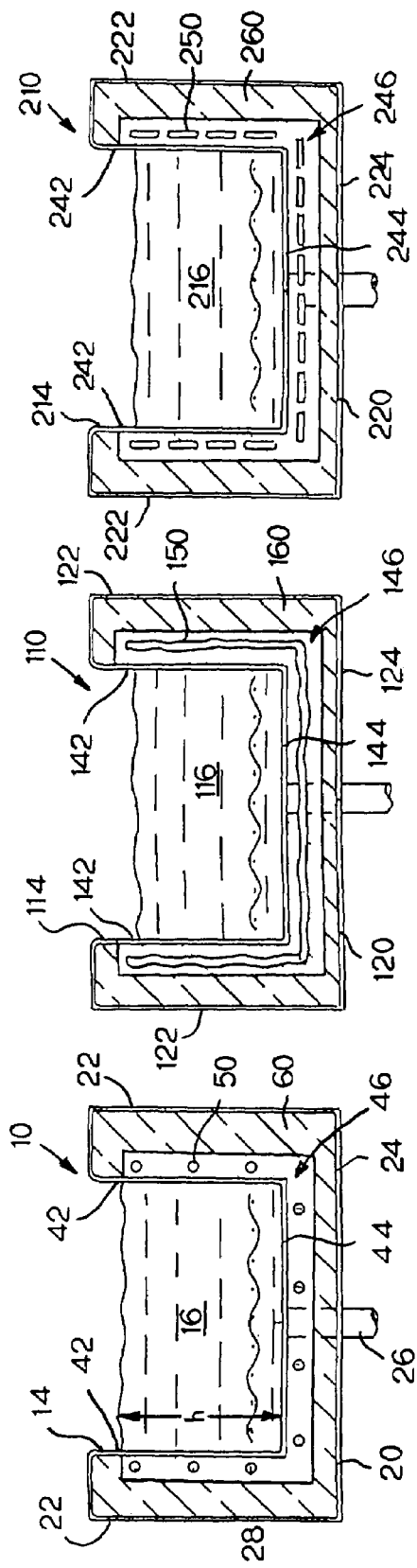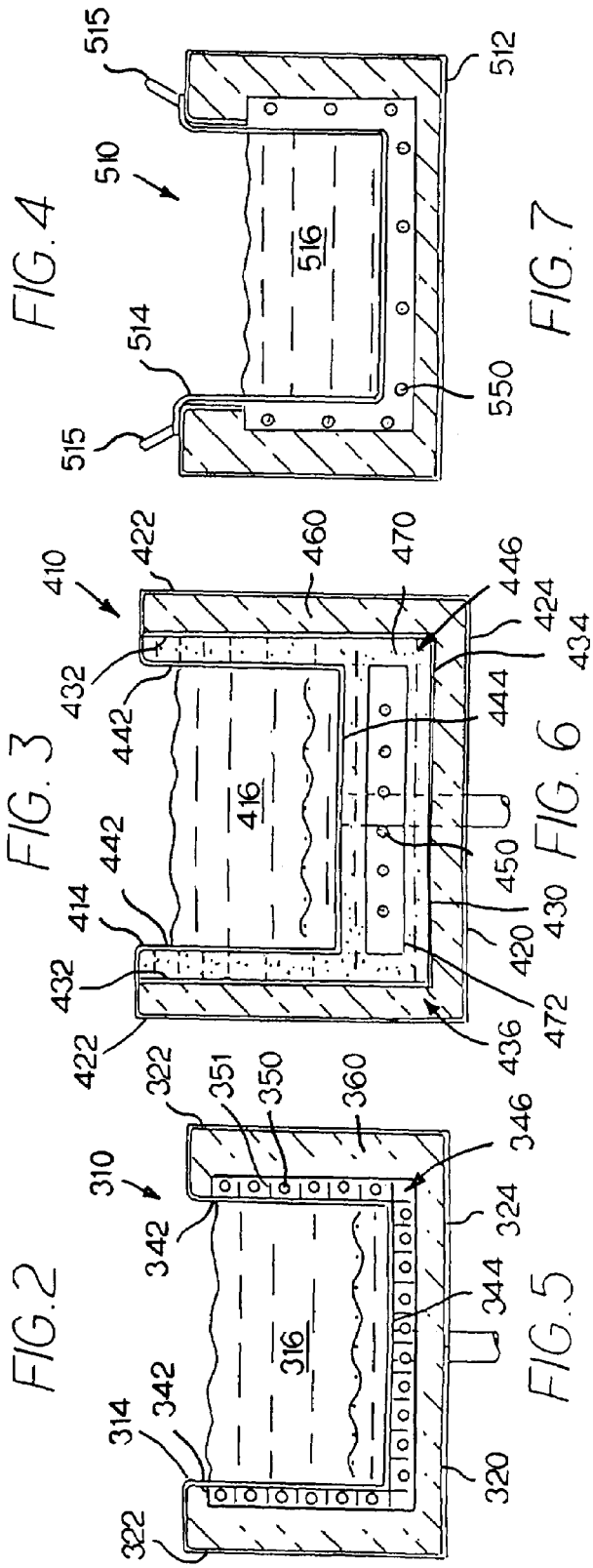

EXTERNALLY HEATED DEEP FAT FRYER

BACKGROUND OF THE INVENTION

This invention relates to cooking apparatus and methods, and, more particularly, to a deep fat fryer for the frying of foods through the uniform transfer of heat over a large area to a cooking medium in which the food is immersed.

The cooking apparatus that are employed to fry foods are legion in number and vary in complexity from the simple, as typified by U.S. Pat. No. 3,722,498 issued on Mar. 27, 1973 to Kimbrough, to the more complex, as represented by U.S. Pat. No. 4,913,041 issued on Apr. 3, 1990 to Taber et al. The object of all prior art deep fat fryers is to constantly transfer heat to the cooking medium, such as oil or shortening (and generally referred to as "cooking oil" or "oil" in the discussion that follows), so as to raise and maintain the temperature of the cooking oil at a level sufficient to fry the selected food and to cook the food to the desired consistency and texture. However, the nature of the cooking oil is such that, over a period of time, it ultimately degrades and deteriorates. This deterioration is partly due to chemical changes that occur in the fats and oils through hydrolization, oxidation and new carbon—carbon linkages. Such deterioration in the cooking oil itself ultimately requires replacement with fresh oil.

Additionally, food particles carbonize due to the high cooking heat in proximity to the heating elements, resulting in a collection of fine debris within the oil itself over a period of use. For example, many foods are encased in batters containing both free and bound sugars and amino acids. During the browning process, the free-floating batter particles, often referred to as "cracklings," become increasingly dark, and a bitterness can be detected through tasting. Furthermore, the cooking oil itself becomes dark in color. Ultimately, the flavor of the food is detrimentally affected. One common way to reduce the amount of food particles in the cooking oil is to periodically filter the oil. While filtering may help address the problem, it clearly represents both capital and labor expenses. Operators frequently find it more economical to replace a portion of the used oil with fresh oil and dispose of the used oil. However, it still remains a goal of those skilled in the art to reduce the turnover in oil usage by increasing the longevity of use of the oil.

As alluded to above, the degradation and deterioration of the cooking oil over a period of time is primarily related to the high heat needed to heat the cooking oil to the desired operating temperature. That is, the cooking oil is generally heated by elements immersed within the oil itself. Because the cooking oil is an inefficient medium for transferring heat, i.e., has a low transfer of heat coefficient, it is necessary that the heating elements operate at temperatures significantly higher than the average operating temperature of the oil. Thus, the oil directly adjacent the elements is at a much higher temperature than oil a short distance away. More often than not, the temperature of the heating elements exceeds the "smoke point" of the cooking oil itself. To minimize degradation and deterioration, prior art deep fat fryers generally provide for structural designs and volume capacities that promote the natural circulation within the frying tank. Natural circulation, i.e., circulation without pumps and the like, requires that the body of the cooking oil be sufficiently large to allow oil circulation from changes in relative densities due to heating and cooling. Thus, in most prior art deep fat fryers, the body of oil used at any one time is considerably larger than is actually required to cook the food. This clearly requires tank volumes to be sufficiently large to accommodate the quantity of oil appropriate to minimize rapid oil degradation. Unfortunately, space in most cooking facilities is at a premium.

Still another problem associated with prior art deep fat fryers is the significant heat loss of the cooking oil through the external walls. Heating inefficiencies require longer sustained heating by the elements themselves and results in greater oil degradation. Thus, some of the prior art fryers attempt to address heat loss inefficiencies.

Additionally, many improvements in the state of the art have occurred as a direct result of attempts to allay handling and cleaning problems associated with deep fat fryers. Handling of the fryer at the high operating temperatures is awkward as a consequence of the ever present danger of burn injuries to personnel. Reducing the frequency of handling clearly would lower the probability of injury. Cleaning of the fryer also poses problems due to the collection of carbonized particles at the bottom of the fryer tank and on the heating elements themselves. In many fryers, the heating elements are removable or pivotable to allow personnel to scour all internal wall surfaces. Drain valves are often located at the bottoms of the tanks to permit drainage of the used and dirty oil. Too frequently, however, the drains themselves become plugged with debris.

An example of a deep fat fryer developed to reduce the localized heating effect often found in fryers and to increase the efficiency of heat transfer is U.S. Pat. No. 4,690,127 issued on Sep. 1, 1987 to Sank. This patent describes the use of a catalytic heater having an elongated hollow oval structure adapted to immersed in the cooking oil. Aside from the clear fact that the heat transfer within the oil is largely unaffected, the volume occupied by the catalytic heater is significant.

The aforementioned U.S. Pat. No. 4,913,041 represents still another attempt to increase the efficiency of heat transfer by eliminating some of the heat loss through the external walls of the fryer tank and to facilitate the cleaning of the fryer. The fryer tank itself is provided with a plurality of wells extending from the bottom of the tank. Oil within the wells is heated by the passage of hot gas along horizontal passageways, thus providing a larger surface area for heat transfer to the oil as compared to tubular heating elements immersed in the oil.

Other attempts at improvements in heat transfer efficiency have been the use of gas infrared burners (porous ceramic plates) butted to the walls of the fry tank or suspended in cylinders at the bottom of the fry tank. Additionally, convection fryers have been developed in which hot oil is pumped continuously through the fry tank.

It is therefore an object of the present invention to provide a deep fat fryer that improves the efficiency of transfer of heat from the heating elements to the cooking oil.

It is another object of the present invention to provide an improved deep fat fryer that facilitates cleaning and handling of the fryer.

It is still another object of the present invention to provide an improved deep fat fryer that reduces the amount of oil needed for cooking.

It is yet another object of the present invention to provide an improved deep fat fryer apparatus that lowers the rate of cooking oil degradation and deterioration during use.

These and other objects and advantages of the present invention will become apparent upon a reading of the following description.

SUMMARY OF THE INVENTION

The present invention is an externally heated deep fat fryer, a cooking apparatus for the deep frying of foods that improves the efficiency of transfer of heat from the heating elements to the cooking oil and addresses other problems prevalent in prior art apparatus.

An exemplary deep fat fryer made in accordance with the present invention includes a frame structure with an upper portion that defines a tank for receiving a volume of cooking oil. In this regard, the fryer may include a substantially rectangular outer shell comprised of four vertical side walls and a bottom wall. A substantially rectangular tank, comprised of four vertical side walls and a bottom wall, is then received in and spaced a distance away from the outer shell, thus creating a cavity between the outer shell and the tank.

One or more heating elements are received and secured in the cavity between the outer shell and the tank, substantially adjacent to the walls of the tank. The heating elements are arrayed along all walls of the tank, such that the heating elements essentially blanket the external surfaces of the tank. Heat generated by the heating elements is conducted through the respective walls of the tank and to the cooking oil. Because the heating elements are positioned below and along all side walls of the tank, a more uniform heating of the cooking oil can be achieved, while the temperatures at the walls remain below the smoke point of the cooking oil.

Furthermore, high temperature insulation material is placed in the cavity between the outer shell and the heating elements. In other words, the insulation material substantially surrounds the heating elements, minimizing heat loss through the outer shell and ensuring substantially all generated heat is transferred to the cooking oil

DESCRIPTION OF THE DRAWINGS

FIG. 2 is a sectional view of the deep fat fryer of FIG. 1 taken along line 2—2 of FIG. 1;

FIG. 3 is a sectional view of another exemplary embodiment of a deep fat fryer made in accordance with the present invention;

FIG. 4 is a sectional view of another exemplary embodiment of a deep fat fryer made in accordance with the present invention;

FIG. 5 is a sectional view of another exemplary embodiment of a deep fat fryer made in accordance with the present invention;

FIG. 6 is a sectional view of another exemplary embodiment of a deep fat fryer made in accordance with the present invention; and FIG. 7 is a sectional view of another exemplary embodiment of a deep fat fryer made in accordance with the present invention.

DETAILED DESCRIPTION OF THE INVENTION

Figure 1:
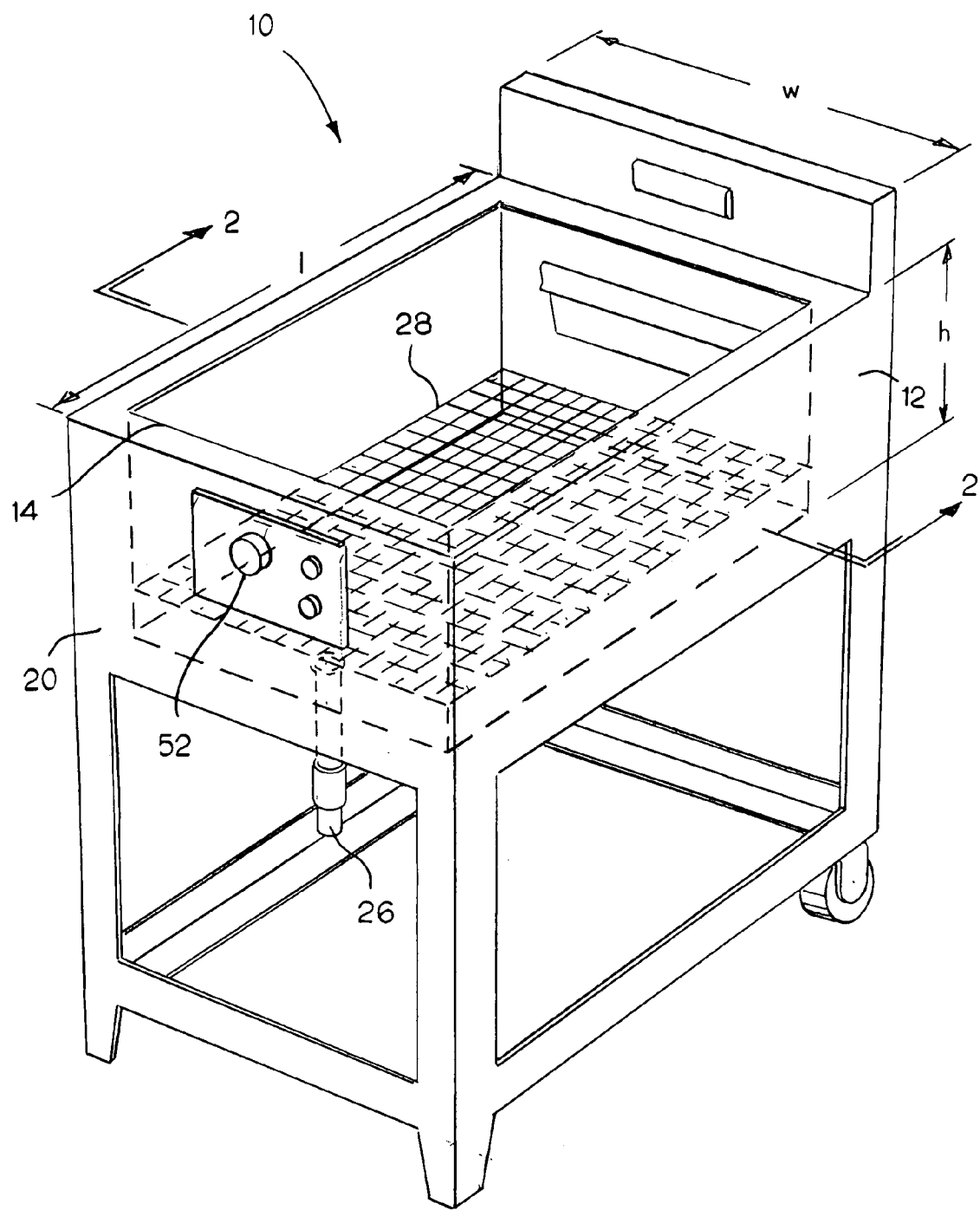
FIG. 1 is a perspective view of an exemplary embodiment of an externally heated deep fat fryer made in accordance with the present invention.

The present invention is an externally heated deep fat fryer, a cooking apparatus for the deep frying of foods that improves the efficiency of transfer of heat from the heating elements to the cooking oil and addresses other problems prevalent in prior art apparatus.

As mentioned above, a typical deep fat fryer includes a tank for holding a volume of cooking oil. The tank and related structure are commonly made from sheets of stainless steel or some other similar metallic material being substantial inert with respect to the effects of sustained heating and corrosion due to chemical attack from foods cooked in the fryer. The heating elements are immersed in the cooking oil held within the tank, and commonly are tubes that carry either electrically resistant wires or hot gases (e.g., natural gas or propane). Then, a mesh fry basket holding the food to be cooked its positioned in the tank above the heating elements. In this regard, it should be noted that he region of the cooking oil below these heating elements is commonly referred to as the "cold zone," with the volume of cooking oil in the cold zone often being about equal to the volume of cooking oil above the heating elements.

Furthermore, the interior walls of the tank of a typical deep fat fryer normally are sloped to converge to a drain outlet in the bottom of the tank. In theory, when food particles become carbonized into cracklings, they drift downwardly toward the drain outlet, such that a valve can be opened to remove the cracklings along with a portion of the cooking oil. Practically, however, the operators often find it necessary to force the accumulated cracklings and debris through the drain outlet, and little cooking oil is actually preserved. Indeed, in most deep fat fryers, the heating elements are pivotable or removable so to allow the operators easy access to the bottom of the fryer for cleaning and removal of the cracklings and debris.

In operation, a typical deep fat fryer requires the heating elements to reach temperatures of 450° F. to 550° F. in order to maintain the oil operating temperature at about 350° F. to 375° F. Because of the elevated temperatures of the heating elements, oil in close proximity to the heating elements often reaches the smoke point of about 425° F. Furthermore, the oil reaching such temperatures carbonizes about the heating elements because of the elevated temperatures, thus requiring frequent cleaning of the elements. To minimize carbonization and frequent changes of the oil, the capacity of the fryer tank is often increased to allow greater natural circulation of the cooking oil about the heating elements. As the temperature of the cooking oil about the elements increases with a concomitant reduction in the density of the heated oil, the less dense oil rises from the region around the heating elements, circulates outwardly toward the walls of the tank, cools and then settles into the cold zone. The major reason that most prior art fryers have large oil capacities is to permit such natural oil circulation while allowing sufficient oil at the prescribed operating temperature to cook the food. Despite the large oil holding capacities of the fryer tanks, the cooking oil near the heating elements inevitably deteriorates, resulting in the need for frequent changes in the oil being used for frying.

FIG. 1 is a perspective view of an exemplary embodiment of an externally heated deep fat fryer 10 made in accordance with the present invention, and FIG. 2 is a sectional view of this exemplary fryer 10. As illustrated, the fryer 10 generally includes a frame structure 12 with an upper portion that defines the tank 14 for receiving a volume of cooking oil (as generally indicated by reference numeral 16 in FIG. 2). Specifically, and as best illustrated in FIG. 2, the fryer 10 includes a substantially rectangular outer shell 20 comprised of four vertical side walls 22 and a bottom wall 24. A substantially rectangular tank 14, comprised of four vertical side walls 42 and a bottom wall 44, is received in and spaced a distance away from the outer shell 20, thus creating a cavity 46 between the outer shell 20 and the tank 14. These various walls are preferably constructed from stainless steel or other materials having high heat transfer efficiencies.

Referring still to FIG. 2, the heating elements 50 are received and secured in the cavity 46 between the outer shell 20 and the tank 14, substantially adjacent to the walls 42, 44 of the tank 14. As such, the heating elements 50 do not contact the cooking oil 16 in the tank 14. In this exemplary embodiment, the heating elements 50 are sheathed steel tubular elements, such as those commercially available from Chromalox, Inc. of Pittsburgh, Pa. The tubular heating elements 50 are arrayed not only along the left and right side walls 42 and the bottom wall 44 of the tank 14, as illustrated in FIG. 2, but also are arrayed along the front and rear walls of the tank 14. In other words, the heating elements 50 essentially blanket the external surfaces of the tank 14.

The heating elements 50 are suitably connected in a well-known manner to an appropriate source of electrical power. A rheostat 52 or similar instrument for controlling the amount of current flowing through the heating elements 50, and thus the temperature of fryer 10, may be mounted on the front panel of the fryer 10. In any event, the heat generated by the heating elements 50 is conducted through the respective walls 42, 44 of the tank 14 and to the cooking oil 16. Because the heating elements 50 are positioned below and along all side walls 42 of the tank, a more uniform heating of the cooking oil 16 can be achieved, while the temperatures at the walls 42, 44 remain below the smoke point of the cooking oil 16.

Furthermore, and referring still to FIG. 2, high temperature insulation material 60 is placed in the cavity 46 between the outer shell 20 and the heating elements 50. In other words, the insulation material 60 substantially surrounds the heating elements 50, minimizing heat loss through the outer shell 20 and ensuring substantially all generated heat is transferred to the cooking oil 16. For example, one possible insulation material 60 for this application is a hydrous calcium silicate material marketed and promoted under the Thermo-12® trademark by the Johns-Manville Corporation of Denver, Colo. Other course, various other insulation materials may also be incorporated into the deep fat fryer of the present invention without departing from the spirit and scope of the present invention.

Although not essential to the present invention, as illustrated in FIGS. 1 and 2, the exemplary deep fat fryer 10 also includes a drain outlet 26 which is operably connected to a valve (not shown) to allow all or a portion of the cooking oil and accumulated cracklings to be removed from the tank 14. In this regard, although not illustrated in FIGS. 1 and 2, it is contemplated that the interior walls of the tank be sloped to converge to the drain outlet 26, so when food particles become carbonized into cracklings, they are directed toward the drain outlet 26. Furthermore, the exemplary deep fat fryer 10 includes a mesh screen 28 that is received in the tank 14 at a spaced distance above the bottom wall 44 of the tank 14, a screen 28 that is designed to catch larger cracklings and debris that might otherwise clog the drain outlet. Lastly, in this exemplary embodiment and as illustrated in FIG. 1, the deep fat fryer 10 may be provided with casters, wheels, or similar means for facilitating movement of and transport of the fryer 10.

In any event, by providing uniform heating over all external surfaces of the tank 14, a more uniform and efficient heating can be achieved, while the temperatures at the walls 42, 44 of the tank 14 remain below the smoke point of the cooking oil.

For example, for sake of calculation, assume that the tank 14 has a length (l) of 16 inches; a width (w) of 14 inches; and has a cooking oil depth (h) of 7 inches. Therefore, there are six surface areas through which heat loss can occur:

$$A_{sides}=2*(16 \text{ in.})*(7 \text{ in.})*(1 \text{ ft}^2/144 \text{ in}^2)=1.556 \text{ ft}^2 \quad (1)$$

$$A_{front}=(14 \text{ in.})*(7 \text{ in.})*(1 \text{ ft}^2/144 \text{ in}^2)=0.681 \text{ ft}^2 \quad (2)$$

$$A_{rear}=(14 \text{ in.})*(7 \text{ in.})*(1 \text{ ft}^2/144 \text{ in}^2)=0.681 \text{ ft}^2 \quad (3)$$

$$A_{top}=(16 \text{ in.})*(14 \text{ in.})*(1 \text{ ft}^2/144 \text{ in}^2)=1.556 \text{ ft}^2 \quad (4)$$

$$A_{bottom}=(16 \text{ in.})*(14 \text{ in.})*(1 \text{ ft}^2/144 \text{ in}^2)=1.556 \text{ ft}^2 \quad (5)$$

The total surface area for heat loss is therefore approximately 6.03 ft$^2$.

Now, assuming that sixteen gauge stainless steel is used to construct the tank, which has an approximate weight density of 2.69 lbs/ft$^2$, the total weight of the tank walls contacting the cooking oil is approximately 12 lbs. Furthermore, to be conservative, we will assume that there is an additional weight of approximately 5 lbs due to mounting hardware, etc. for a total tank weight of 17 lbs.

$$W_{tank}=(A_{sides}+A_{front}+A_{rear}+A_{bottom})(2.69 \text{ lbs/ft}^2)+(5 \text{ lbs})=17 \text{ lbs} \quad (6)$$

Also, assuming that the cooking oil has a weight density of 57.2 lb/ft$^3$, the total weight of the oil is approximately 51.9 lbs.

$$W_{oil}=(16 \text{ in.})*(14 \text{ in.})*(7 \text{ in.})*(1 \text{ ft}^3/1728 \text{ in}^3)(57.2 \text{ lbs/ft}^3)=51.9 \text{ lbs} \quad (7)$$

Finally, based on the dimensions of the exemplary deep fat fryer as set forth above, it is estimated that 7.25 ft$^2$ of insulation material will be needed, with the total weight of the insulation material ($W_{ins}$) being approximately 29 lbs.

Based on these dimensions and assumptions, it is possible to calculate the start-up heat required ($Q_T$) to elevate the temperature of the cooking oil from approximately 70° F. (room temperature) to 375° F. (operating temperature). Specifically, as the following equations illustrate, the start-up heat required ($Q_T$) is a sum of the heat required ($Q_M$) to elevate the temperature of the relevant components of the fryer (i.e., the walls of the tank, the cooking oil, and the insulation material) and the heat loss ($Q_L$) during operation:

$$Q_M = Q_{M1(TANK)} + Q_{M2(OIL)} + Q_{M3(INSULATION)} \quad (8)$$

$$Q_L = Q_{L1(INSULATION)} + Q_{L2(TOP)} \quad (9)$$

$$Q_T = Q_M + Q_{L(AVG)} \quad (10)$$

In calculating these values, and assuming that the heat transfer coefficient for the insulating material is approximately 30 watts per square foot per hour, and the heat transfer coefficient for the cooking oil is approximately 340 watts per square foot per hour:

$$Q_{L1} = A_{INSULATION} * (30 \text{ watts}/\text{ft}^2/\text{hr}) = 7.25 \text{ ft}^2 * \\ (30 \text{ watts}/\text{ft}^2/\text{hr}) \\ = 0.217 \text{ kW/hr} \quad (11)$$

$$Q_{L2} = A_{TOP} * (340 \text{ watts}/\text{ft}^2/\text{hr}) = 1.556 \text{ ft}^2 * \\ (340 \text{ watts}/\text{ft}^2/\text{hr}) \\ = 0.530 \text{ kW/hr} \quad (12)$$

$$Q_L = 0.217 \text{ kW/hr} + 0.530 \text{ kW/hr} = 0.747 \text{ kW/hr} \quad (13)$$

Now, returning to the calculation of the heat required to elevate the temperature of the relevant components of the fryer:

$$Q_M = W * C_p * \Delta T * (1 \text{ kW}/3412 \text{ BTU}) \quad (14)$$

where W=Weight (lbs)
$C_p$=Specific Heat (BTU/° F./lb)
$\Delta T$=Temperature Change (° F.)

Therefore, $$Q_{M1} = 17 * 0.12 * (375-70)/3412 = 0.182 \text{ kW} \quad (15)$$

$$Q_{M2} = 51.9 * 0.29 * (375-70)/3412 = 1.35 \text{ kW} \quad (16)$$

With respect to $Q_{M3}$, which is the heat required to raise the temperature of the insulation material to the operating temperature, we assume that the external temperature of the insulation material is approximately 100° F. and the internal temperature is approximately 770° F., an average temperature of 435° F. when the cooking oil reaches its operating temperature. Therefore:

$$Q_{M3} = 29 * 0.25 * (435-70)/3412 = 0.775 \text{ kW} \quad (17)$$

$$Q_M = 0.182 \text{ kW} + 1.35 \text{ kW} + 0.775 \text{ kW} = 2.307 \text{ kW} \quad (18)$$

Finally, in calculating the total heat ($Q_T$), it is also important to consider the time allotted for elevating the temperature of the cooking oil from room temperature (70° F.) to an appropriate operating temperature (375° F.). In this particular example, we assume that 20 minutes (or 0.333 hours) are allotted for elevating the temperature of the cooking oil to the operating temperature. Therefore, the heat required ($Q_M$) to elevate the temperature of the relevant components of the fryer is actually three times greater than the value calculated above in equation (18). Furthermore, since the heat loss ($Q_L$) during operation was calculated assuming that the oil was at its operating temperature, it is necessary to determine an average heat loss $Q_{L(AVG)}$, which is simply the average of the heat loss prior to the application of heat (zero) until the cooking oil reaches its operating temperature, as calculated in equation (13). Finally, since heat loss only occurs over 20 minutes, that is also factored into the calculation of the total heat ($Q_T$):

$$Q_{T(20mins)} = Q_M + Q_{L(AVG)} = 3 * Q_M + (Q_L/2) * (0.333 \text{ hrs}) \quad (19)$$

$$Q_{T(20mins)} = 3 * 2.307 \text{ kW} + [(0.747 \text{ kW/hr})/2] * (0.333 \text{ hrs}) = 7.05 \text{ kW} \quad (20)$$

This can now be contrasted to a common deep fat fryer in which the heating elements are immersed in the cooking oil held within the tank. With respect to such an immersion fryer, the tank dimensions are assumed to be identical, but it is estimated that at least 3.5 additional inches of oil will be required to accommodate the cold zone beneath the heating elements for a total cooking oil depth (h) of 10.5 inches. Again, there are six surface areas through which heat loss can occur:

$$A_{sides} = 2 * (16 \text{ in.}) * (10.5 \text{ in.}) * (1 \text{ ft}^2/144 \text{ in}^2) = 2.333 \text{ ft}^2 \quad (21)$$

$$A_{front} = (14 \text{ in.}) * (10.5 \text{ in.}) * (1 \text{ ft}^2/144 \text{ in}^2) = 1.021 \text{ ft}^2 \quad (22)$$

$$A_{rear} = (14 \text{ in.}) * (10.5 \text{ in.}) * (1 \text{ ft}^2/144 \text{ in}^2) = 1.021 \text{ ft}^2 \quad (23)$$

$$A_{top} = (16 \text{ in.}) * (14 \text{ in.}) * (1 \text{ ft}^2/144 \text{ in}^2) = 1.556 \text{ ft}^2 \quad (24)$$

$$A_{bottom} = (16 \text{ in.}) * (14 \text{ in.}) * (1 \text{ ft}^2/144 \text{ in}^2) = 1.556 \text{ ft}^2 \quad (25)$$

The total surface area for heat loss is therefore approximately 7.49 ft².

Again, assuming that sixteen gauge stainless steel is used to construct the tank, which has an approximate weight density of 2.69 lbs/ft², the total weight of the tank walls contacting the cooking oil is approximately 15.95 lbs. Furthermore, to be conservative, we will assume that there is an additional weight of approximately 5 lbs due to mounting hardware, etc. for a total tank weight of 20.95 lbs.

$$W_{tank} = (A_{sides} + A_{front} + A_{rear} + A_{bottom})(2.69 \text{ lbs/ft}^2) + (5 \text{ lbs}) = 20.95 \text{ lbs} \quad (26)$$

Assuming that the cooking oil has a weight density of 57.2 lb/ft³, the total weight of the oil is approximately 77.85 lbs.

$$W_{oil} = (16 \text{ in.}) * (14 \text{ in.}) * (10.5 \text{ in.}) * (1 \text{ ft}^3/1728 \text{ in}^3)(57.2 \text{ lbs/ft}^3) = 77.85 \text{ lbs} \quad (27)$$

Finally, it is important to keep in mind that in typical deep fat fryers, there is no insulation material, and thus, there is substantial heat loss through the walls of the tank. Therefore, based on these dimensions and assumptions, the start-up heat ($Q_T$) required to elevate the temperature of the cooking oil from approximately 70° F. to 375° F. is a sum of the heat required ($Q_M$) to elevate the temperature of the relevant components of the fryer (i.e., the walls of the tank and the cooking oil) and the heat loss ($Q_L$) during operation:

$$Q_M = Q_{M1(TANK)} + Q_{M2(OIL)} \quad (28)$$

$$Q_L = Q_{L1(SIDES, FRONT, REAR)} + Q_{L2(BOTTOM)} + Q_{L3(TOP)} \quad (29)$$

$$Q_T = Q_M + Q_{L(AVG)} \quad (30)$$

In calculating these values, and assuming that (a) the heat transfer coefficient though the side, front and rear walls of the tank is approximately 210 watts per square foot; (b) the heat transfer coefficient though the bottom wall of the tank is approximately 110 watts per square foot; and (c) the heat transfer coefficient for the cooking oil is approximately 340 watts per square foot:

$$Q_{L1} = 4.375 \text{ ft}^2 * (210 \text{ watts/ft}^2/\text{hr}) = 0.920 \text{ kW/hr} \quad (31)$$

$$Q_{L2} = 1.556 \text{ ft}^2 * (110 \text{ watts/ft}^2/\text{hr}) = 0.170 \text{ kW/hr} \quad (32)$$

$$Q_{L3} = 1.556 \text{ ft}^2 * (340 \text{ watts/ft}^2/\text{hr}) = 0.529 \text{ kW/hr} \quad (33)$$

$$Q_L = 0.920 \text{ kW/hr} + 0.170 \text{ kW/hr} + 0.530 \text{ kW/hr} = 1.62 \text{ kW/hr} \quad (34)$$

Now, returning to the calculation of the heat required to elevate the temperature of the relevant components of the fryer $$Q_M = W * C_p * \Delta T * (1 \text{ kW}/3412 \text{ BTU}) \quad (35)$$

where W=Weight (lbs)
$C_p$=Specific Heat (BTU/° F./lb)
$\Delta T$=Temperature Change (° F.)

Therefore, $$Q_{M1} = 20.95 * 0.12 * (375-70)/3412 = 0.225 \text{ kW} \quad (36)$$

$$Q_{M2} = 77.85 * 0.29 * (375-70)/3412 = 2.02 \text{ kW} \quad (37)$$

$$Q_M = 0.2252 \text{ kW} + 2.20 \text{ kW} = 2.245 \text{ kW} \quad (38)$$

Therefore, similar to equations (19) and (20) above, the total heat ($Q_T$) can be calculated as follows:

$$Q_{T(20mins)} = Q_M + Q_{L(AVG)} = 3 * Q_M + (Q_L/2) * (0.333 \text{ hrs}) \quad (39)$$

$$Q_{T(20mins)} = 3 * 2.245 \text{ kW} + [(1.62 \text{ kW/hr})/2] * (0.333 \text{ hrs}) = 7.01 \text{ kW} \quad (40)$$

Comparing the start-up heat required ($Q_T$) for the fryer 10 of the present invention to that of a common immersion fryer, there is no appreciable difference with respect to the required start-up heat as both require approximately 7 kW. However, there is a significant difference in continuing operating costs as the heat losses for the fryer of present invention are approximately 0.747 kW/hr, while the heat losses for a similarly dimensioned immersion fryer are approximately 1.62 kW/hr. In other words, there is better than a fifty-percent improvement in the fryer of the present invention that provides not only for a continuing energy savings with respect to operation of the fryer, but also reduces the cost of cooling the ambient air in the vicinity of the fryer.

Perhaps most importantly, as discussed in the calculations presented above, the volume of cooking oil 16 required for operation of the fryer 10 of the present invention is significantly less than an equivalent fryer in which the heating elements are immersed within the cooking oil. Specifically, and as described in the example calculations above, there may be as much as 3.5 inches or more of cooking oil below the heating elements in an immersion fryer forming a cold zone to minimize overheating the oil and to promote convection. Such a cold zone is simply not required when external heating is employed as in the present invention. Such a reduction is not only a savings with respect to initial cooking oil requirements, but over time, because the cooking oil 16 in the fryer 10 of the present invention can be used for longer periods of time without replacement. This is a benefit of the temperatures at the walls 42, 44 of the tank 14 remaining below the smoke point of the cooking oil 16. Thus, there is not the level of degradation and deterioration of the cooking oil 16 that is often found in typical deep fat fryers.

FIG. 3 is a sectional view of another exemplary embodiment of a deep fat fryer 110 made in accordance with the present invention. In this exemplary embodiment, the fryer 110 again generally includes a substantially rectangular outer shell 120 comprised of four vertical side walls 122 and a bottom wall 124. A substantially rectangular tank 114, comprised of four vertical side walls 142 and a bottom wall 144, is received in and spaced a distance away from the outer shell 120, thus creating a cavity 146 between the outer shell 120 and the tank 114. The heating elements 150 are received and secured in the cavity 146 between the outer shell 120 and the tank 114 along all external surfaces of the tank 114. In this exemplary embodiment, the heating elements 150 are one or more flexible woven or blanket heaters, such as those commercially available from Chromalox, Inc. of Pittsburgh, Pa. Furthermore, high temperature insulation material 160 is placed in the cavity 146 between the outer shell 120 and the heating elements 150, substantially surrounding the heating elements 150. As with the embodiment described above with reference to FIGS. 1 and 2, the heat generated by the heating elements 150 is conducted through the respective walls 142, 144 of the tank 114 and to the cooking oil 116 to provide a uniform heating of the cooking oil 116.

FIG. 4 is a sectional view of another exemplary embodiment of a deep fat fryer 210 made in accordance with the present invention. In this exemplary embodiment, the fryer 210 again generally includes a substantially rectangular outer shell 220 comprised of four vertical side walls 222 and a bottom wall 224. A substantially rectangular tank 214, comprised of four vertical side walls 242 and a bottom wall 244, is received in and spaced a distance away from the outer shell 220, thus creating a cavity 246 between the outer shell 220 and the tank 214. The heating elements 250 are received and secured in the cavity 246 between the outer shell 220 and the tank 214 along all external surfaces of the tank 214. In this exemplary embodiment, the heating elements 250 are a plurality of strip heaters, such as those commercially available from Chromalox, Inc. of Pittsburgh, Pa. Furthermore, high temperature insulation material 260 is placed in the cavity 246 between the outer shell 220 and the heating elements 250, substantially surrounding the heating elements 250. As with the embodiments described above, the heat generated by the heating elements 250 is conducted through the respective walls 242, 244 of the tank 214 and to the cooking oil 216 to provide a uniform heating of the cooking oil 216.

FIG. 5 is a sectional view of another exemplary embodiment of a deep fat fryer 310 made in accordance with the present invention. In this exemplary embodiment, the fryer 310 again generally includes a substantially rectangular outer shell 320 comprised of four vertical side walls 322 and a bottom wall 324. A substantially rectangular tank 314, comprised of four vertical side walls 342 and a bottom wall 344, is received in and spaced a distance away from the outer shell 320, thus creating a cavity 346 between the outer shell 320 and the tank 314. The heating elements 350 are received and secured in the cavity 346 between the outer shell 320 and the tank 314 along all external surfaces of the tank 314. In this exemplary embodiment and similar to the embodiment described with respect to FIGS. 1 and 2, the heating elements 350 are sheathed steel tubular elements, such as those commercially available from Chromalox, Inc. of Pittsburgh, Pa. Additionally, there is a series of fins 351 interposed between the heating elements 350 to increase the efficiency of the heat transfer to the walls 342, 344 of the tank 314. Finally, high temperature insulation material 360 is placed in the cavity 346 between the outer shell 320 and the heating elements 350, substantially surrounding the heating elements 350. As with the embodiments described above, the heat generated by the heating elements 350 is conducted through the respective walls 342, 344 of the tank 314 and to the cooking oil 316 to provide a uniform heating of the cooking oil 316.

FIG. 6 is a sectional view of another exemplary embodiment of a deep fat fryer 410 made in accordance with the present invention. In this exemplary embodiment, the fryer 410 again generally includes a substantially rectangular outer shell 420 comprised of four vertical side walls 422 and a bottom wall 424. A substantially rectangular inner shell 430 comprised of four vertical side walls 432 and a bottom wall 434 is then received in and spaced a distance away from the outer shell 420, thus creating a cavity 436 between the outer shell 420 and the inner shell 430. Finally, the tank 414 is comprised of four vertical side walls 442 and a bottom wall 444, and the tank 414 is received in and spaced a distance away from the inner shell 430, thus creating another cavity 446 between the inner shell 430 and the tank 414.

Unlike the embodiments described above with reference to FIGS. 1–5, however, heat is provided to the tank 414 in this exemplary embodiment by a liquid heat transfer medium 470. As illustrated in FIG. 6, this liquid heat transfer medium 470 is received and held in the cavity 446 between the inner shell 430 and the tank 414 along all external surfaces of the tank 414. The liquid heat transfer medium 470 preferably demonstrates little thermal expansion in a confined space at temperatures ranging from room temperature to about 700° F. One preferred liquid for this application is a silicon polymer manufactured and distributed by the Dow Corning Corporation of Midland, Mich. under the registered trademark Syltherm XLT®.

Additionally, there is a closed compartment 472 within this cavity 446 and immersed in liquid heat transfer medium 470, which is preferably constructed of stainless steel or other material having high heat transfer efficiency. One or more heating elements 450 are contained within the compartment 472 and provide heat to the surrounding liquid heat transfer medium 470. In this exemplary, embodiment, the heating elements 450 are sheathed steel tubular elements, such as those commercially available from Chromalox, Inc. of Pittsburgh, Pa. However, other heaters, including both electric and gas heaters, could be used without departing from the spirit and scope of the present invention. In any event, the liquid heat transfer medium 470 receives heat from the heating elements 450 and then transfers heat to the respective walls 442, 444 of the tank 414 evenly, this providing for uniform heating of the cooking oil 416.

Lastly, with respect to the embodiment illustrated in FIG. 6, high temperature insulation material 460 is placed in the cavity 436 between the outer shell 420 and the inner shell 430, substantially surrounding the liquid heat transfer medium 470.

FIG. 7 is a sectional view of another exemplary embodiment of a deep fat fryer 510 made in accordance with the present invention. This fryer 510 is essentially identical to that described above with reference to FIGS. 1 and 2, except that the tank 514 (and cooking oil 516 contained therein) is removable from the frame structure of the fryer 512. For this reason, the tank 514 is provided with handles 515 such that it can be lifted out of and away from the remainder of the fryer 510, exposing the heating elements 550. Because of this construction, the fryer 510 does not require a drain outlet.

It will be obvious to those skilled in the art that further modifications may be made to the embodiments described herein without departing from the spirit and scope of the present invention.

What is claimed is:

1. A deep fat fryer, comprising:
   a tank defined by a plurality of side walls and at least one bottom wall for receiving and holding a volume of cooking oil;
   a liquid heat transfer medium substantially surrounding the tank;
   one or more heating elements positioned external to the tank and substantially adjacent said liquid heat transfer medium, such that the liquid heat transfer medium receives heat from the heating elements and then transfers heat through the respective walls of the tank for substantially uniform heating of the cooking oil; and
   insulation material external to and substantially surrounding the liquid heat transfer medium.

2. The deep fat fryer as recited in claim 1, and further comprising a closed compartment immersed the liquid heat transfer medium, said one or more heating elements being contained within the closed compartment.

3. The deep fat fryer as recited in claim 1, wherein said one or more heating elements are tubular heating elements.

4. The deep fat fryer as recited in claim 3, wherein fins are interposed between adjacent tubular heating elements to increase the efficiency of the heat transfer to the liquid heat transfer medium.

5. The deep fat fryer as recited in claim 1, wherein said one or heating elements are blanket-type heaters.

6. The deep fat fryer as recited in claim 1, wherein said one or more heating elements are strip heaters.

7. The deep fat fryer as recited in claim 1, wherein said one or more heating elements are gas heaters.

8. A deep fat fryer, comprising:
   a tank defined by a plurality of side walls and at least one bottom wall for receiving and holding a volume of cooking oil, each wall having an external surface;
   one or more sheathed tubular heating elements positioned adjacent to a substantial portion of the external surfaces of the walls of the tank for providing substantially uniform heating through the walls and to the cooking oil, wherein fins are interposed between adjacent tubular heating elements to increase the efficiency of the heat transfer through the walls of the tank and to the cooking oil; and
   insulation material external to and substantially surrounding the heating elements.

* * * * *